United States Patent [19]

Moekle et al.

[11] Patent Number: 4,671,042

[45] Date of Patent: Jun. 9, 1987

[54] APPARATUS FOR FORMING AND PACKAGING STUFFED PRODUCT

[76] Inventors: Charles D. Moekle, 10063 Grandview Ave., Allegheny County, Pittsburgh, Pa. 15235; James A. Moekle, 1471 North Boulevard, Portage County, Kent, Ohio 44240

[21] Appl. No.: 648,176

[22] Filed: Sep. 7, 1984

[51] Int. Cl.⁴ ............................................. A22C 11/02
[52] U.S. Cl. ......................................... 53/122; 17/33; 17/1 F; 53/517; 53/251; 53/244; 53/236
[58] Field of Search ............... 17/33, 34, 1 F; 83/167, 83/154, 161, 112, 23; 53/251, 236, 177, 517, 122, 244

[56] References Cited

U.S. PATENT DOCUMENTS

| | | | |
|---|---|---|---|
| 2,541,907 | 2/1951 | Appling | 53/517 X |
| 4,073,039 | 2/1978 | Müller | 17/33 |
| 4,129,923 | 12/1978 | Hoegger | 17/33 |
| 4,194,343 | 3/1980 | Myers et al. | 53/244 X |

*Primary Examiner*—Willie G. Abercrombie

[57] ABSTRACT

An apparatus for continuously forming a stuffed product characterized by tube means for feeding a pliable product into a casing; conveyor means for carrying the encased product from the tube means; pincher means for squeezing the encased product at intervals to form twisted links; means for cutting the twists between the links; and means for transferring the links from the conveyor means to a package receptacle.

14 Claims, 40 Drawing Figures

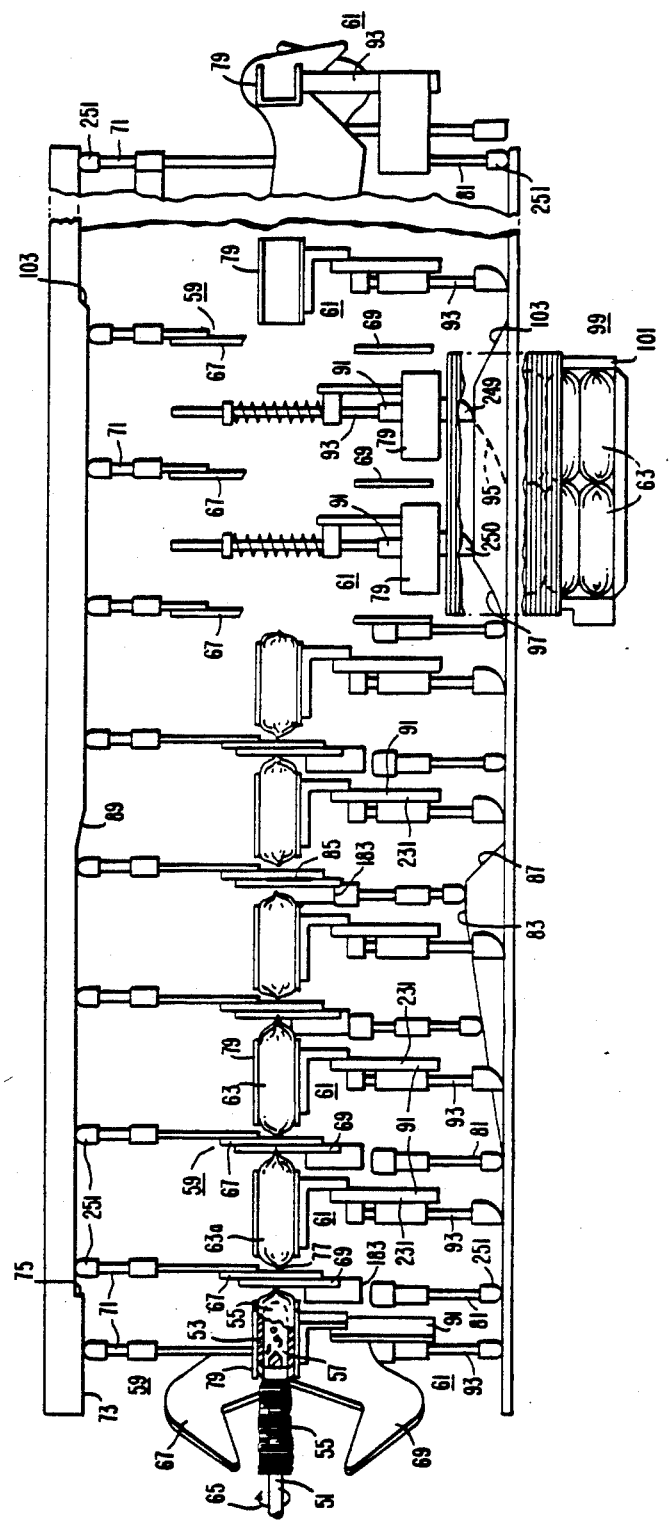

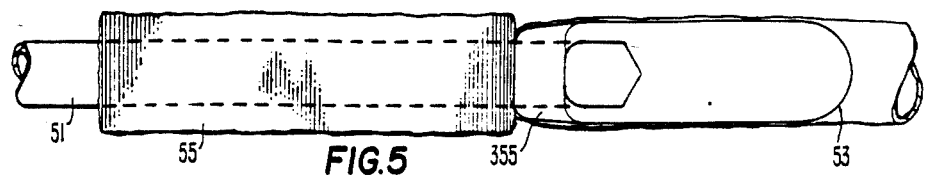
FIG.5
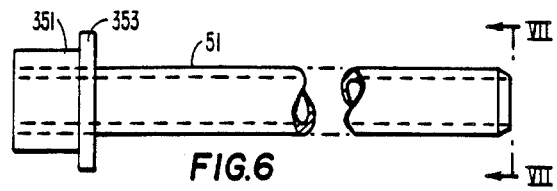
FIG.6
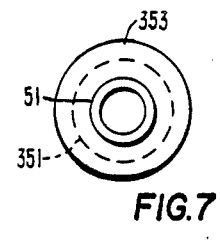
FIG.7
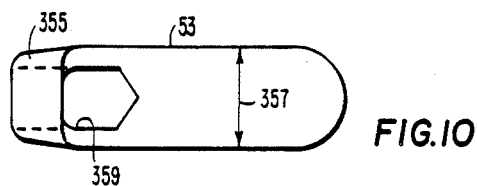
FIG.10
FIG.9
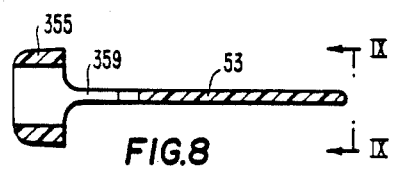
FIG.8
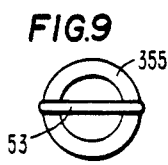
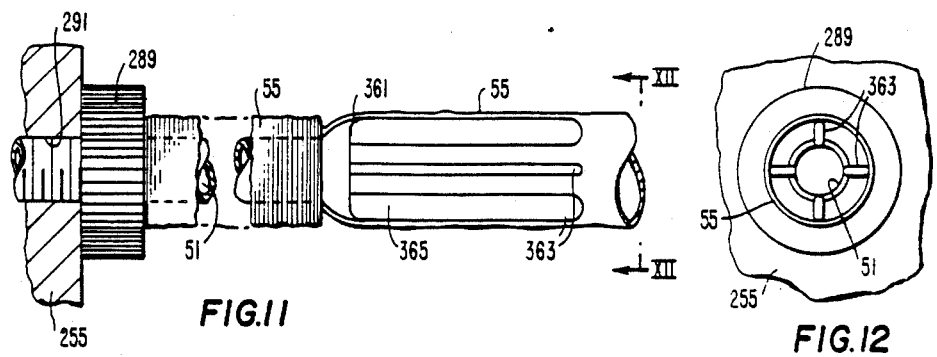
FIG.11
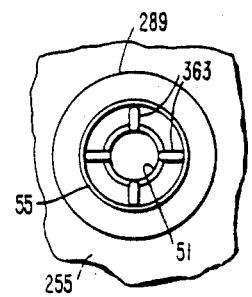
FIG.12
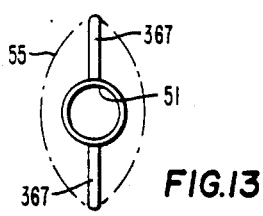
FIG.13

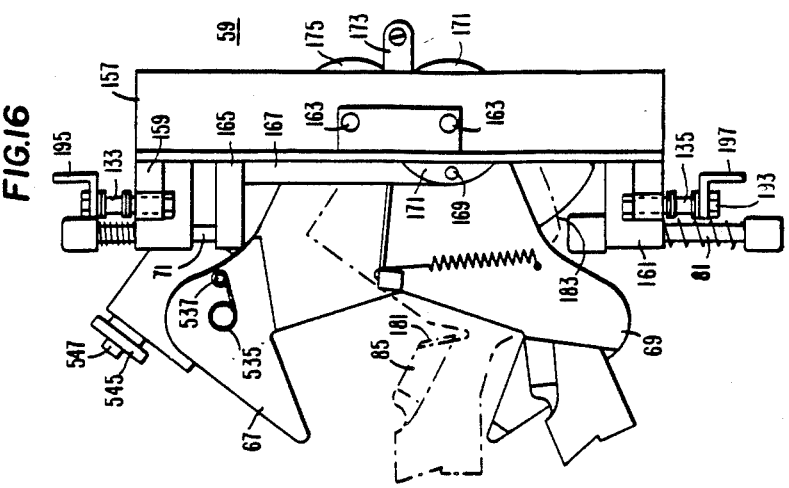

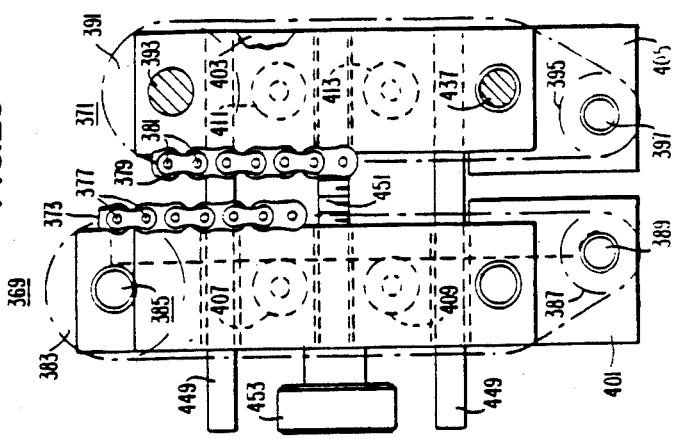

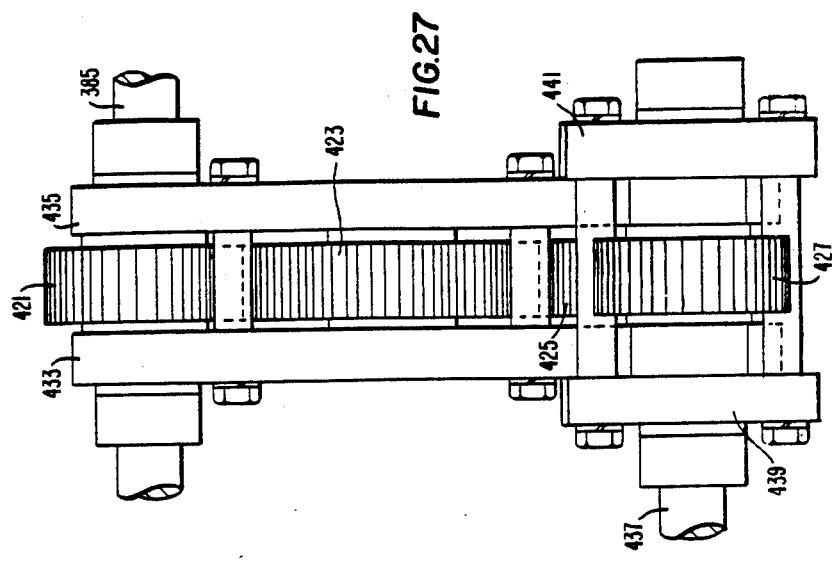
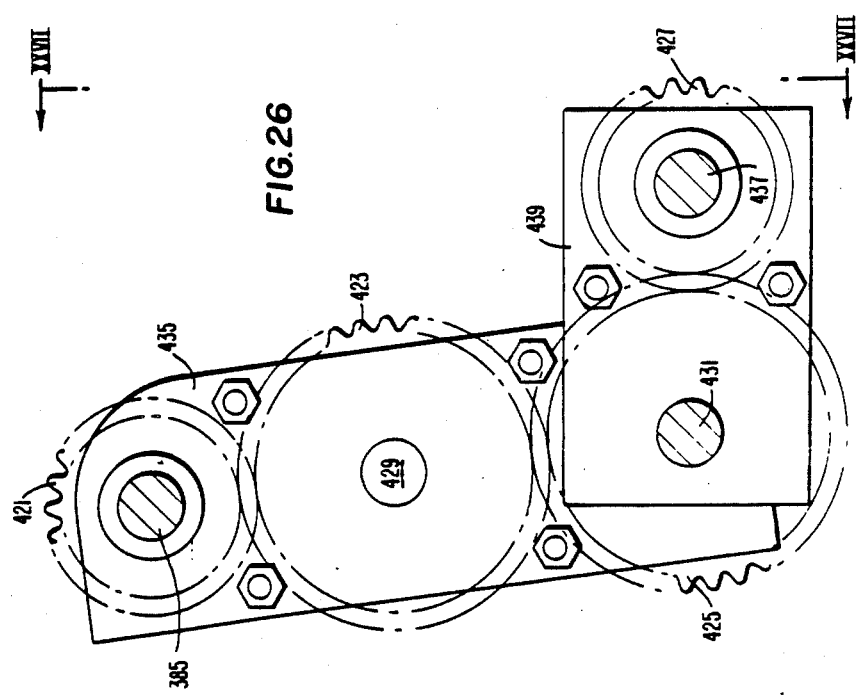

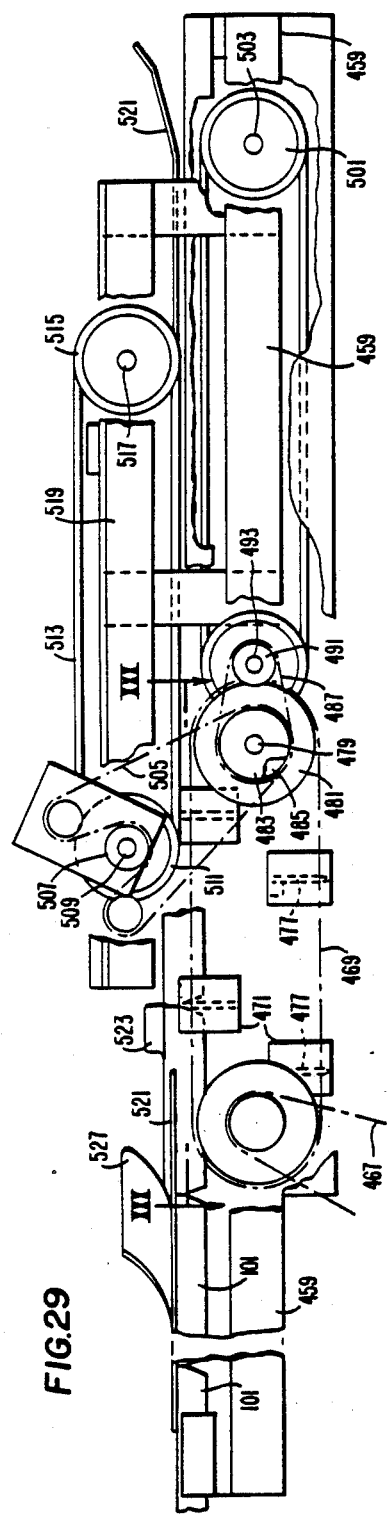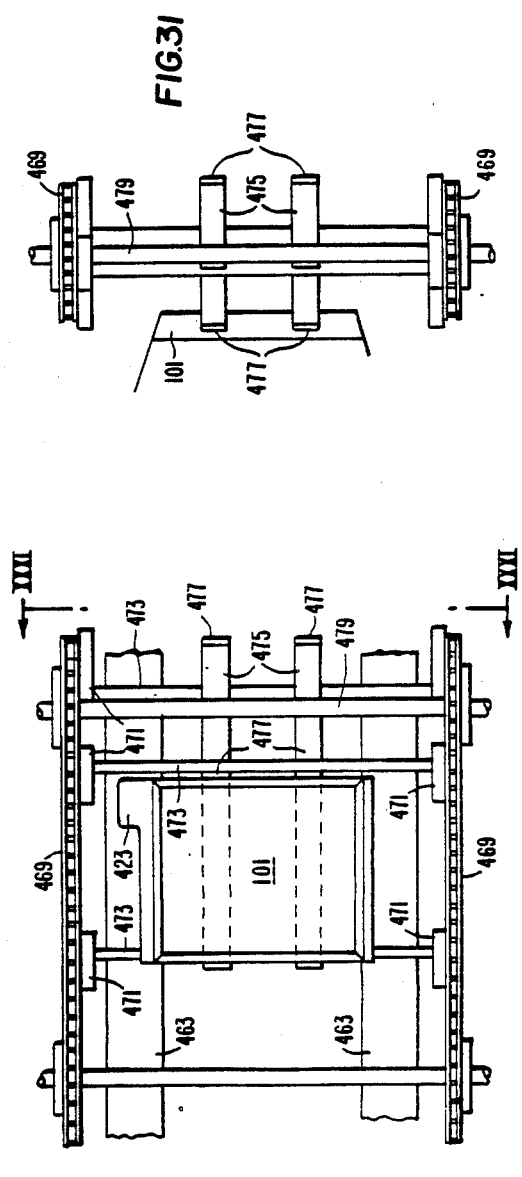

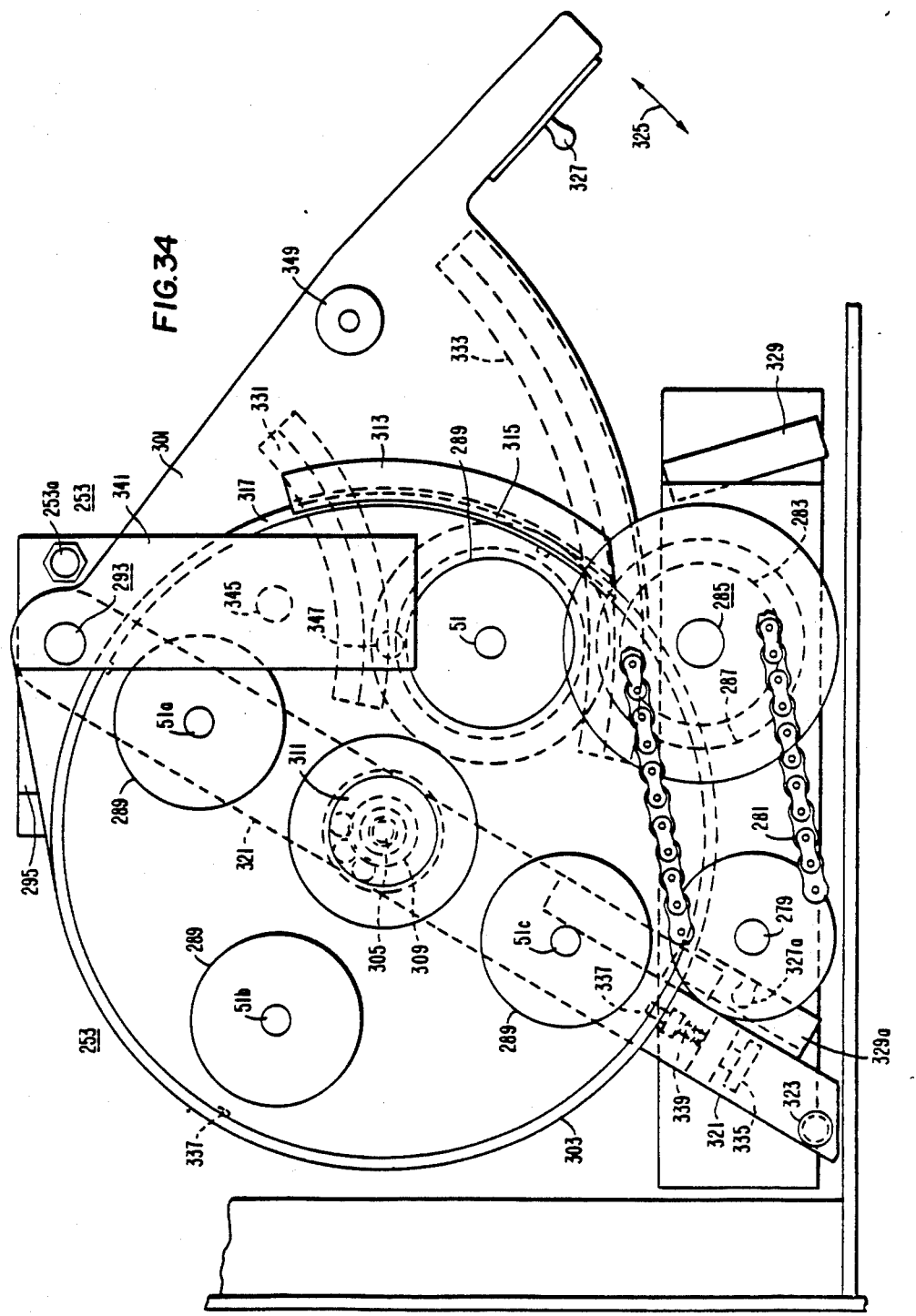

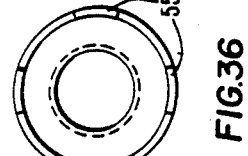
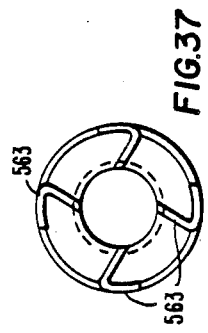
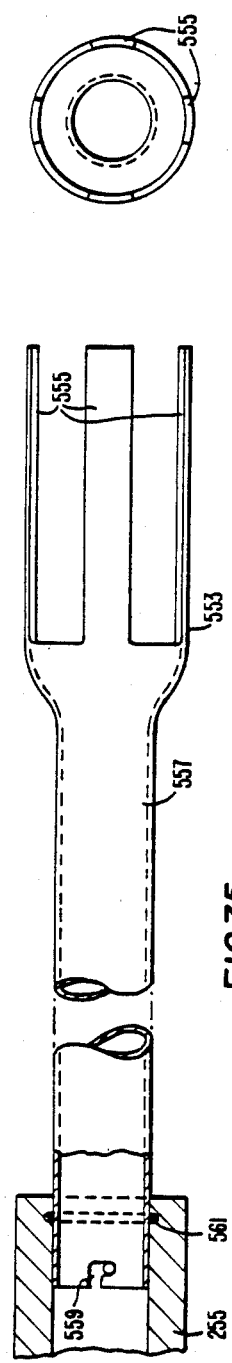
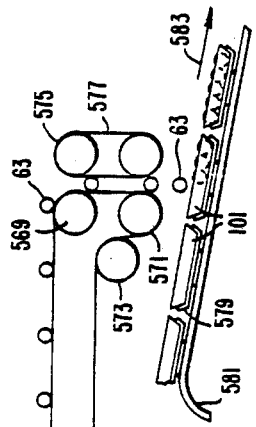
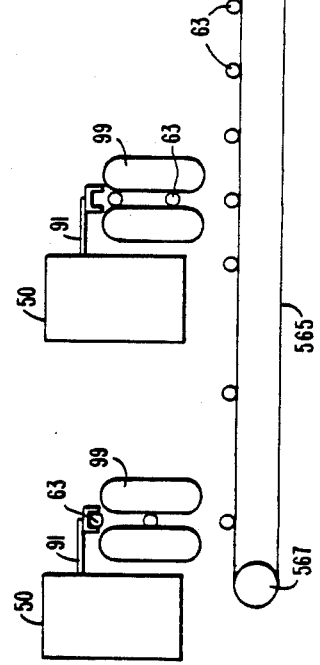

APPARATUS FOR FORMING AND PACKAGING STUFFED PRODUCT

BACKGROUND OF THE INVENTION

1. Field of the Invention

This invention relates to a device for making stuffed products, and more particularly, it pertains to the making of linked products, such as sausages, and the like.

2. Description of the Prior Art

Apparatus for making linked products by continuously stuffing a length of casing with pliable product, such as sausage stuffing and linking machines, are well known in the art. Examples of such machines are disclosed in the following U.S. Pat. Nos: 3,166,784; 3,264,679; 3,739,425; 3,748,690; 3,835,503; 3,868,747; and 4,129,923.

Most of the machines in use are limited to specific functions, such as filling or stuffing a casing with pliable product, linking the stuffed casing through a separate linking chain, or a linking head associated with the stuffer, without subsequently placing the finished product automatically into a container for shipment. Indeed, most machines are dependent upon manual handling of the product for packaging, whereby bacteria is imparted to the product which limits its ultimate shelf life. Moreover, manual packaging is slow and very costly.

Associated with the foregoing has been a problem of avoiding damage to a casing while rotating the casing during stuffing with the product. Various methods have been attempted in vain to apply a rotational force to the casing while periodically pinching the casing to provide a twist between each link of stuffed product. Stuffed casing passing through a rotating chuck encounters considerable frictional drag, because the casing passes through a rotating member which is not moving in the direction of the advancing casing. Any external force is associated with rotational drive but also a stationary position with respect to the longitudinal motion of the casing; therefore external frictional drag results on very thin casing. If an inadequate or ineffective rotational force is applied to the extruding column of product emitting from the horn exit port, the casing on the horn rotates at a greater speed than that of the forming links, causing the casing on the horn to twist and often break before being filled with product, in the stuffing zone.

Another problem with most prior devices has been that of orienting stuffed product links into a marketable tray. In other words, most prior apparatus for forming links of stuffed product have provided no means to control or provide alignment of said links to place them in trays or packages as the final phase of the production cycle. Links are formed and discharged in a scattered pattern because the apparatus did not provide sufficient control over the link from the start to the finish of its production to prevent misalignment of the link at the packaging end of the procedure.

SUMMARY OF THE INVENTION

In accordance with this invention, apparatus for making a stuffed product into product links, comprising: product-feeding means including a tube for supporting a product casing to be stuffed with a filling, such as an emulsion or product grind, extruded from an outlet end of the tube to form a stuffed product; transfer means for moving the stuffed product along a path of movement from the outlet end and including a plurality of spaced holders; cutting means for cutting the stuffed product into links; deflecting means for removing the links from the transfer means; guide means adjacent to the transfer means for receiving the links from the deflecting means; and receptacle transfer means at the end of the guide means for holding receptacles for the links delivered from the guide means. In addition to the foregoing, the product-feeding means includes a rotatable tube for imparting rotation to a product casing.

The invention also comprises a method for forming a stuffed product with a filling, emulsion, or product grind, including the steps of: feeding a filling through a tube into a product casing to form a stuffed product; transferring the stuffed product along a path of movement from the tube into a plurality of spaced holders; cutting the stuffed product into links; deflecting the links from the spaced holders; guiding the deflected links to a receptacle; and providing receptacles for the links.

The advantage of the apparatus of this invention is that it satisfies a need for more satisfactorily distributing the stuffed product into the casing to form a voidless, fully-filled, stuffed product while forming product links. The apparatus also performs the functions of cutting the product links into separate links which are placed in precise positions within a shipping package. All functions are performed automatically and without handling by personnel to avoid bacterial contamination of the product, and to greatly reduce costly labor factors.

BRIEF DESCRIPTION OF THE DRAWINGS

FIG. 4 is an enlarged fragmentary view showing the path of motion of the stuffed links from their formation to the ultimate packaged product;

FIG. 5 is an enlarged fragmentary view of the outlet end of the stuffing tube together with the product paddle and the shirred strand of casing;

FIG. 6 is a side view of the stuffing tube without the paddle and casing as shown in FIG. 5;

FIG. 7 is an end view taken on the line VII—VII of FIG. 6;

FIG. 8 is a side view of the paddle;

FIG. 9 is an end view taken on the line IX—IX of FIG. 8;

FIG. 10 is a plan view of the paddle;

FIG. 11 is a side view of another embodiment of the paddle;

FIG. 12 is an end view taken on the line XII—XII of FIG. 11;

FIG. 13 is an end view of another embodiment of the paddle;

FIG. 14 is a side view of the pincher assembly with jaws in the closed position;

FIG. 15 is an elevational view taken on the line XV—XV of FIG. 14;

FIG. 16 is a side view of the pincher assembly on the side opposite that of FIG. 14, showing the jaws in the open position, and showing the knife blade in retracted and advanced positions;

FIG. 24 is an elevational view of the drop conveyor with a portion broken away;

FIG. 25 is an end view of the drop conveyor;

FIG. 26 is a side view of the gear train for the drop conveyor of FIG. 24;

FIG. 27 is an elevational view of the gear train of FIG. 26 taken on the line XXVII—XXVII of FIG. 26;

FIG. 29 is a side view of the box conveyor taken on the line XXIX—XXIX of FIG. 28A;

FIG. 30 is a plan view taken on the line XXX—XXX of FIG. 29;

FIG. 31 is an end view taken on the line XXXI—XXXI of FIG. 30;

FIG. 34 is a end view taken on the line XXXIV—XXXIV of FIG. 32;

FIG. 35 is a fragmentary sectional view showing the feed tube mounting;

FIG. 36 is an end view of the feed tube shown in FIG. 35;

FIG. 37 is an end view of another embodiment of a paddle for the tube; and

FIG. 38 is a diagrammatic view of a pair of apparatus depositing stuffed products onto a conveyor belt assembly for delivery to shipping receptacles.

DESCRIPTION OF THE PREFERRED EMBODIMENT

The procedure disclosed by this invention involves the production of encased stuffed products in a continuously automatic manner. For the purpose of this invention, encased stuffed products include, such plastic material as meat products including sausage, fats, scrapple, cheese, lard, oleo, margarine, grease, snuff, caulking compounds, and other products normally stuffed into casings, and in the specification and claims, the expressions "filling", "emulsion" or "product material" are intended to include all such materials, and the expression "stuffed product" is intended to include fillings encased within a casing.

In accordance with this invention, the method of forming a stuffed product comprises the steps of: rotating and advancing a product casing in a generally horizontal path of movement, injecting a filling through a nozzle rotating or stationary, into the product casing, constricting the stuffed product downstream of the nozzle thereby forcing the filling to re-orient and completely fill the casing since the constricting members are timed to travel the precise distance to allow the proper amount of filling to extrude from the nozzle. The filling device is timed with a pinching or linking or constricting means movement to accomplish this correlation between filling volume and constricting means travel; separating the links by blade means and/or releasing constriction means; and delivering the links to a shipping container.

Figure 1:
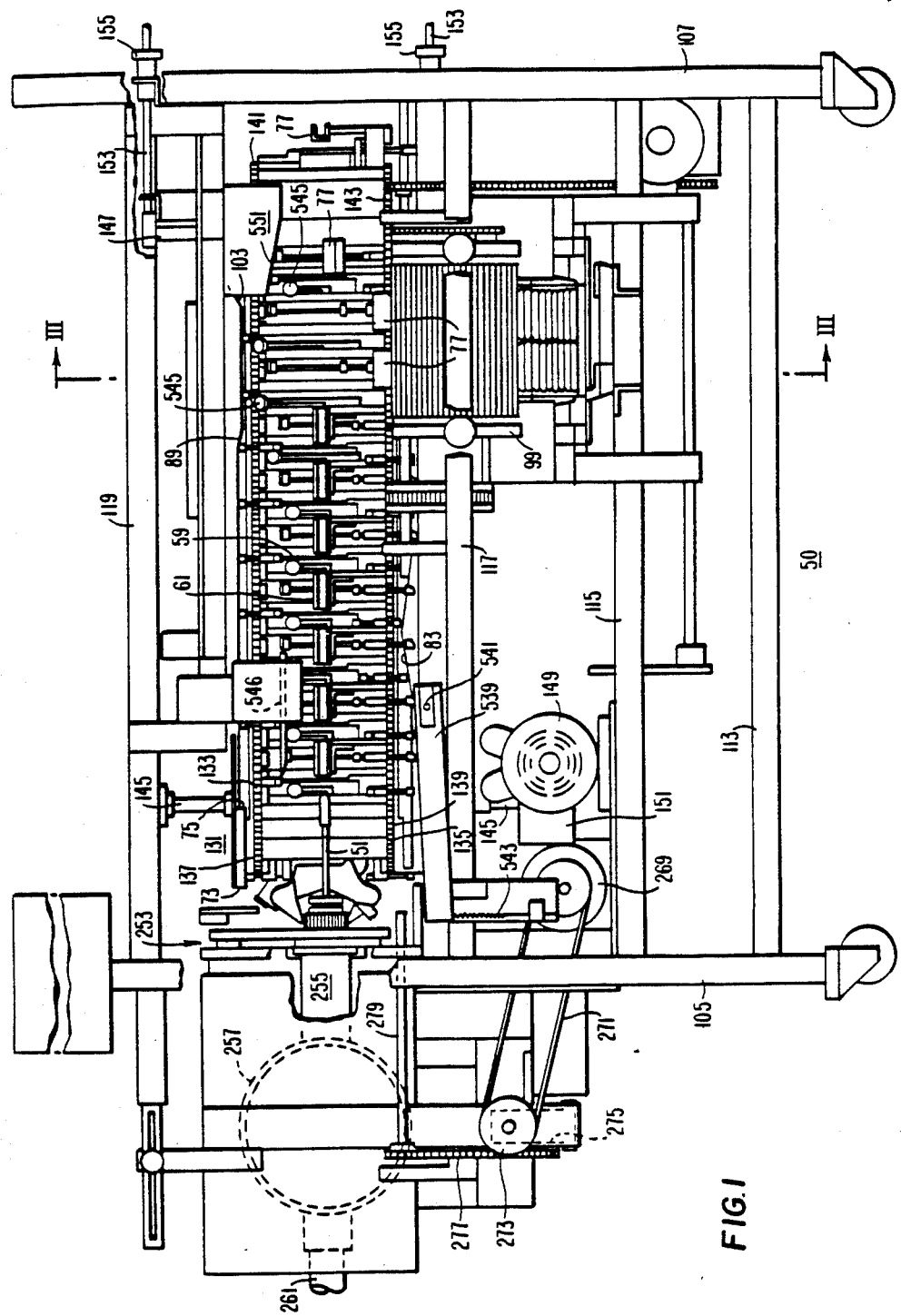
FIG. 1 is an elevational view of one side of the apparatus of this invention.
Figure 2:
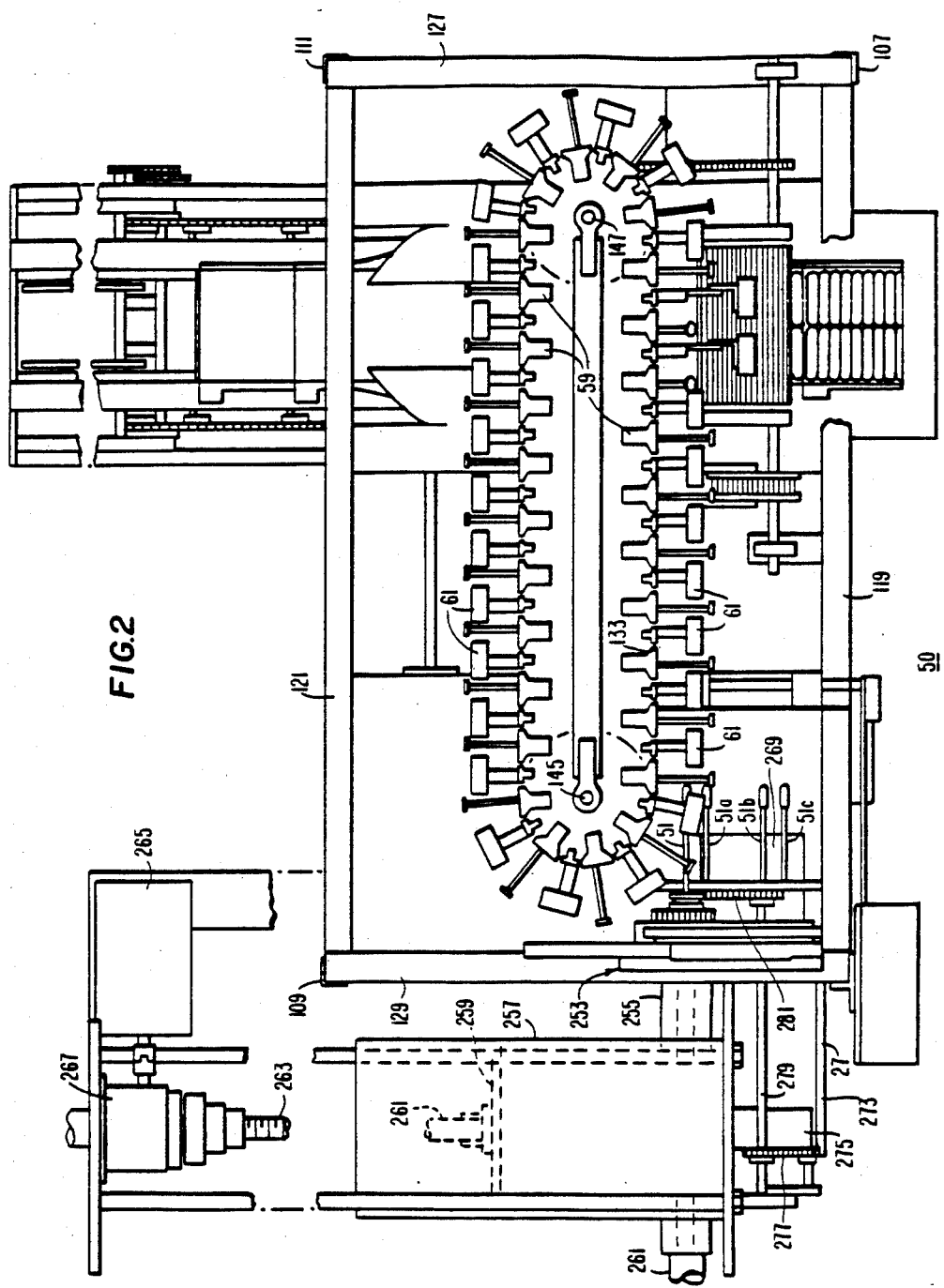
FIG. 2 is a plan view of the apparatus.
Figure 3:
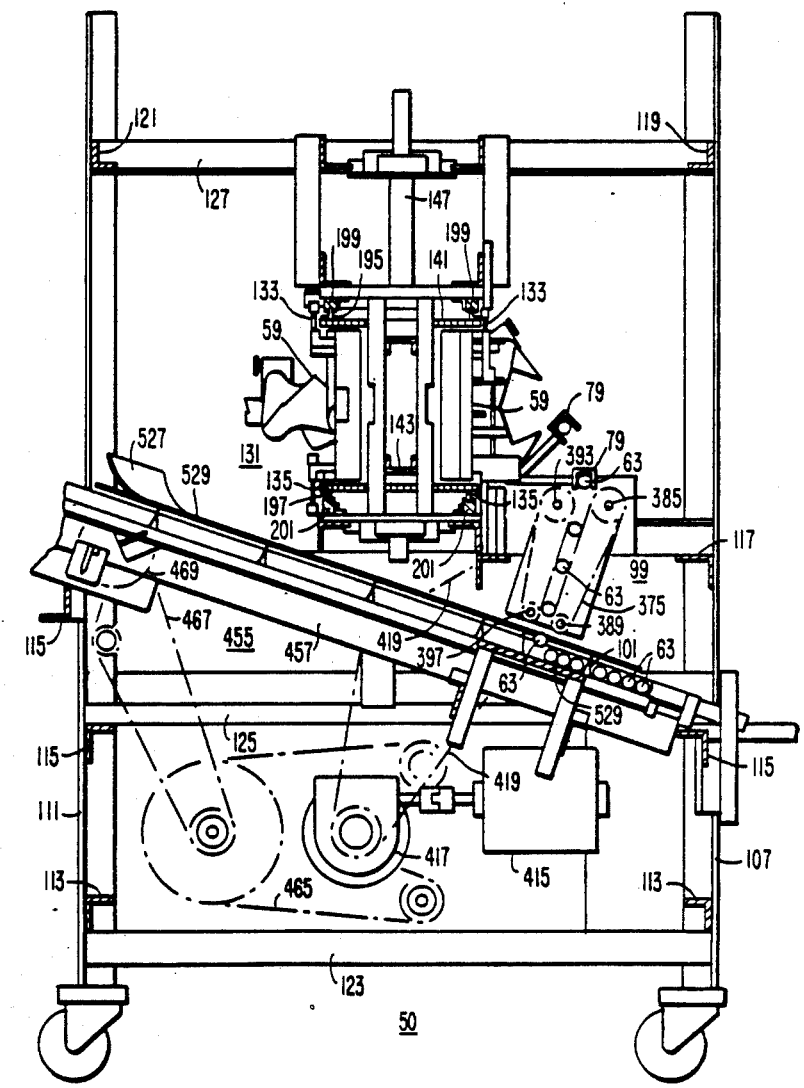
FIG. 3 is a vertical sectional view taken generally on the line III—III of FIG. 1.
Figure 21:
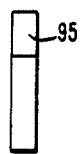
FIG. 21 is an end view of the cam of FIG. 20.
Figure 20:
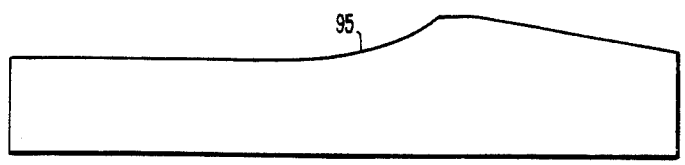
FIG. 20 is an elevational view of a first cam for the transfer unit.
Figure 23:
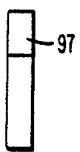
FIG. 23 is an end view of the cam of FIG. 22.
Figure 22:
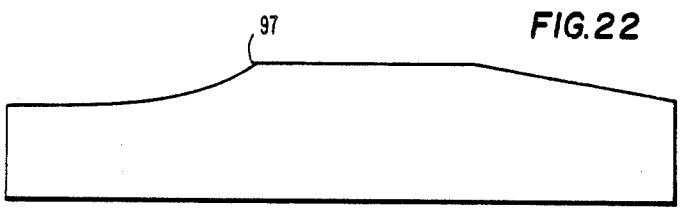
FIG. 22 is an elevational view of a second cam for the transfer unit.

Apparatus 50 by which the method is performed is disclosed in FIGS. 1, 2, and 3. A simplified depiction is shown in FIG. 4 in which the functions of the apparatus are shown in sequence with only the necessary structure included for simplicity of illustration.

In FIG. 4, the functions of stuffing, constricting, cutting, and conveying the finished stuffed product to a marketing container, are shown. At the left end of the apparatus, filler feeding means, or stuffer, such as a tube or horn 51, is horizontally disposed with casing opening or unfurling means, or paddle or snubber 53 mounted on the discharge end of the tube. The tube 51 is horizontally disposed with shirred strands of casing 55 mounted on the upstream end of the paddle 53. The casing extends over and around the snubber 53 where a filling is injected into the expanded casing. Product conveyor means are provided for moving the stuffed product along a path of movement from the tube 51 which means include a plurality of spaced pincher members 59 and transfer units 61 for the links 63 of stuffed product. The pincher members 59 and the transfer units 61 are alternately disposed with clearance provided for the pincher members to constrict the stuffed product into links 63 as the link moves downstream from the paddle 53 where the assembly of the tube and paddle together with the casing may rotate in the direction of an arrow 65. Rotation is desired, but not an indispensible feature.

The assembly of the pincher members 59 and transfer units 61 move in an oval path and as the pincher members 59 move around the left end of the path of movement, the jaws 67, 69 are in an open position by a rod 71 riding on a cam 73. As the upper end of the rod moves off an end 75 of the cam, the jaws 67, 69 are closed by spring action to constrict, squeeze or pinch the stuffed product to form a twist 77 of casing, whereby another link 63a is formed. Simultaneously, a holder 79 moves into position behind the pincher member 59 to cradle the next forming link of stuffed product and continues holding the link 63 as the conveying means moves downstream (to the right) from the tube 51.

As the conveyor means continues moving, a rod 81 on the lower side of each pincher member 59 moves up a cam surface 83 to cause a knife blade 85 to cut the twist 77 at a location between the closed jaws 67, 69, thereby separating the links into individual link units 63. If it is preferred that two or more links be connected together and not separated, the cutting operation may be omitted by preventing the knife blade from being actuated between every pair of links, such as by inactivating the blade in every other pair of pinchers 67 and 69.

As the conveyor means continues moving, the rod passes over an end 87 of the cam, whereby the rods by spring action are returned to a lower position, thereby retracting the knife blade 85. Meanwhile, the rods 71 at the upper end of the pincher members 59 ride downwardly on a cam surface 89 causing the jaws 67, 69 to open, leaving the links 63 supported only by the holder 79.

Each holder 79 is sustained in place by an arm 91 and it is actuated from an upright position to a dumping position (essentially horizontally) by a cam rod 93, whereby one or more, such as two, links 63 are dumped out of the holders as the lower end of the cam rod 93 engages one or more, such as two, cam surfaces 95, 97. Where, for example, two links are unloaded or dumped from the holders, the cam rod 93 of the forward holder 79 moves up the cam surface 95 while behind it the corresponding cam rod moves up a cam surface 97 to which cam surfaces are spaced by a distance equal to the spacing between the corresponding cam rods 93, whereupon the arms 91 are rotated downwardly so that the links 63 drop from the holders 79 into the upper end of a drop conveyor assembly generally indicated at 99, by which two links 63 are lowered into exact positions within a tray container or box 101. Thus, the product links have been controlled from the beginning of the process and have been transferred from the linking chain through the drop conveyor into the tray or package. This machine maintains orientation of the links throughout.

As the conveyor assembly continues to move, the cam rods 93 move down a cam surface 103, whereby the holders 79 are returned by spring action to their upright positions ready for another cycle. At the same time, rods 71 move over a cam surface 103, causing the jaws 67, 69 to close as they move away from the drop conveyor assembly 99. The foregoing illustrates the several functions involved in making and packaging links of a stuffed product.

The support structure for the several parts 51-103 set forth above is disclosed below.

As shown in FIGS. 1, 2, and 3, upright supports 105, 107, 109, 111 are secured together by cross-supports 113, 115, 117, 119, 121, as well as end braces 123, 125, 127, 129, forming a rectangular structure. Productconveyor means are generally indicated at 131 and include a pair of continuous link chains 133, 135 which are separately, horizontally disposed around drive sprockets 137, 139 as well as idler sprockets 141, 143. The drive sprockets 137, 139 are mounted on a drive shaft 145 and the idler sprockets 141, 143 are mounted on a vertical idler shaft 147. A drive motor 149 turns the drive shaft 145 through a speed reducer 151. Tension on the chains 133, 135 is maintained on the shaft 147 through similar take-up screws 153 and knurled nuts 155.

The pincher members 59 as well as the transfer units 61 (FIGS. 1 and 2) are mounted alternately on and between the chains 133, 135, whereby the pincher members and transfer units are rotated counterclockwise (FIG. 2) around the shafts 145, 147. The manner in which the several pincher members 59 and transfer units 61 are mounted on the chains 133, 135 is shown in FIGS. 14-19. The pincher members 59 (FIG. 14) include parallel frames 157 which extend between and are secured to upper and lower members 159, 161. The jaws 67, 69 are mounted on spaced pivot pins 163 where they rotate between closed and open positions (FIGS. 14, 16) through the rod 71, slide member 165 connecting link 167 the lower end of which is connected by pin 169 to a disk 171 rotatably mounted on the lower pivot pin 163. Inter-linkage 173 is pivotally connected between the disk 171 and disk 175 pivotally mounted on the pivot pin 163. Jaws 67, 69 are fixedly mounted on the disks 175, 171, respectively, so that a downward force on the rod 71 by either the cam 73 or 89 opens the jaws as shown in FIG. 16. A tension spring 177, extending between the member 159 and the disk 175 (FIG. 14) and a tension spring 179 extending between the member 161 and the disk 171 close the jaws when the rods 71 ride off of the cams 73, 89 (FIG. 4).

The knife blade 85 having a cutting edge 181 (FIG. 16) is disposed between the jaws 67, 69 (FIG. 15) and includes a cam surface 183. When the lower end of the rod 81 rides up the cam surface 83 (FIG. 4) the upper end of the rod moves against the cam surface 183 to rotate the knife blade 85 upwardly about the pivot pin 163 causing the knife blade to cut the twist 77 of casing between adjacent links which twist extends through an aperture 185 (FIG. 14) created by the jaws in the closed position. The upper end of the frames 157 are secured to the chain 133 by bolts 187, 189 (FIG. 15) and the lower end of the frame is secured to the lower chain 135 by similar bolts 191, 193.

Angle brackets 195, 197 at upper and lower ends of the frame are secured to opposite sides of the chains 133, 135, respectively. The brackets 195, 197 ride in grooved rails 199, 201 (FIG. 3) to stabilize the pincher assembly as it moves in its path through the various camming forces.

Figure 19:
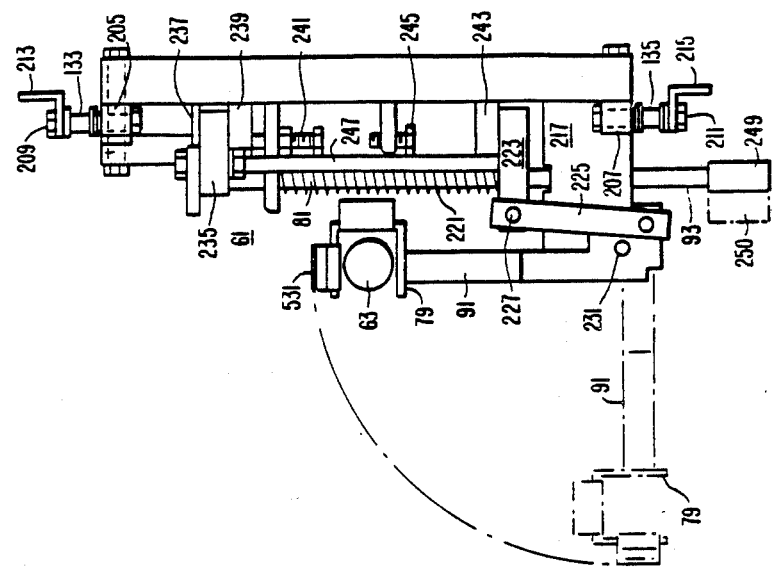
FIG. 19 is a view of the side of the holder assembly opposite that of FIG. 17.
Figure 18:
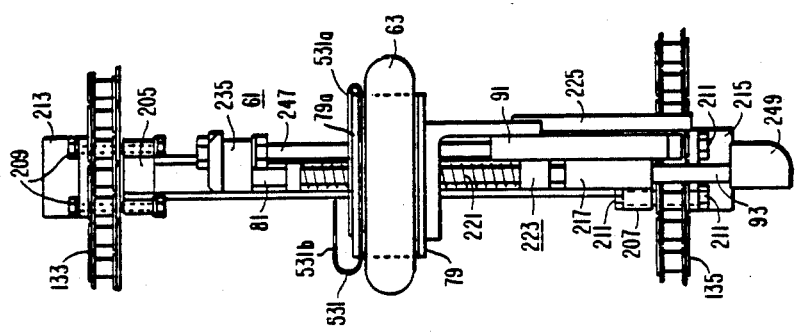
FIG. 18 is an elevational view of the holder assembly showing the stuffed product in place.
Figure 17:
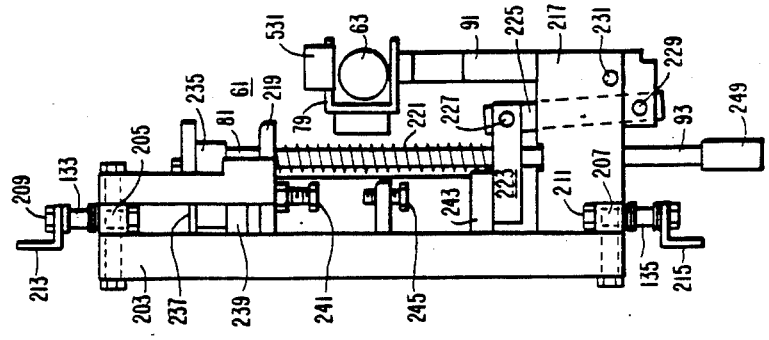
FIG. 17 is a side view of the holder assembly showing the stuffed product link in place.

As shown in FIGS. 17, 18, 19, the transfer unit 61 including the holders 79 comprise a frame 203 having upper and lower blocks 205, 207 by which upper and lower ends of the frame are secured to chains 133, 135 by spaced pairs of bolts 209, 211, respectively. Angle brackets 213, 215 are mounted by the bolts 209, 211 onto the corresponding chains which brackets ride in the grooved rails 119, 201 in a manner similar to the brackets 195, 197 of the pincher assemblies.

In addition to the frame 203, the transfer units include a bracket 217 extending outwardly from and secured to the frame 203. The rod 93 is generally mounted in the bracket 217 as well as in a support member 219 so that the rod 93 is movable vertically against a compression spring 221.

A bar 223 is fixedly mounted on the cam 93 with a link 225 pivotally mounted between pivot pins 227, 229, the latter being in the arm or bell crank 91 which is pivoted at pin 231. The holder 79 is mounted on the upper end of the arm 91 so that when the rod 93 is moved upwardly by one of the cam surfaces 97, 95, the arm 91 rotates the holder 79 to the dumping position (FIG. 4). A guide bar 235 is mounted on the upper end of the rod 93 and is provided with wear pads 237, 239 on upper and lower sides for contact with the block 205 at the upper end and a set screw 241. Similarly, a wear pad 243 is mounted on the bar 223 for engagement with a set screw 245 on the frame 203. An adjustment rod 247 extends between the bars 235, 223.

At the lower end of the rods 93, a wear pad 249 is provided for engagement with one of the cam surfaces 95, 97 (FIG. 4). Alternate wear pads 249 have a width indicated by the solid line of the wear pad (FIG. 19) for engagement with the cam surface 95. For engagement with the cam surface 97, the wear pads 249 have an extension portion indicated by the broken line 250, whereby the other alternate pads engage the cam surface 97 which is adjacent to the cam surface 95. Similar wear pads 251 are provided on rods 71, 81 as shown in FIG. 4.

The feeding mechanism for providing the filling 57 comprises the tube or horn 51 (FIGS. 1, 2, 4, 5) by which the filling is injected into the casing 55. The tube 51 is one of a plurality, such as four similar tubes 51a, 51b, 51c, which are mounted on a turret assembly generally indicted at 253 (FIG. 32) which is described hereinbelow. Although a plurality of tubes are preferably provided for standby purposes, such as mounting shirred strands of casing 55 in preparation for subsequent use, only one tube is necessary.

The tube 51 is in alignment with and connected to a feed tube 255 (FIGS. 1, 2), which in turn communicates with a supply cylinder 257 having a piston 259. An inlet port 261 for the filling is mounted on the cylinder for introducing additional filling in the cylinder when needed.

In operation, the piston 259 is driven from one end of the cylinder toward the feed tube 255 by a screw 263 which is actuated by a motor 265 through a gear box 267, whereby pressure on the filling within the cylinder is forced through the feed tube 255 and the tube 51 into the casing 55. As the filling 57 issues from the outlet end of the tube 51, it is rotated by a motor 269 (FIG. 1) through a drive belt 271, a pulley 273 which drives a gear box 275, a chain 277, a shaft 279, and a chain 281 (FIG. 2). The chain 281 (FIG. 34) rotates a sprocket 283 on a shaft 285 for turning a gear 287 which meshes with a gear 289 mounted on the tube 51. It is noted that although the tube 51 is shown in FIG. 34 as being one of four horns on the turret assembly 253, the tube may be separately mounted with the gear 289. In other words, the turret assembly is optional but is preferred to expedite operation of the apparatus. Where the tube 51 is used without the turret assembly, it is preferably detachably mounted, such as by a threaded connection 291 (FIG. 11), at the outlet end of the feed tube 255. In such an embodiment, the gear 289 is fixedly mounted on the tube 51.

Figure 32:
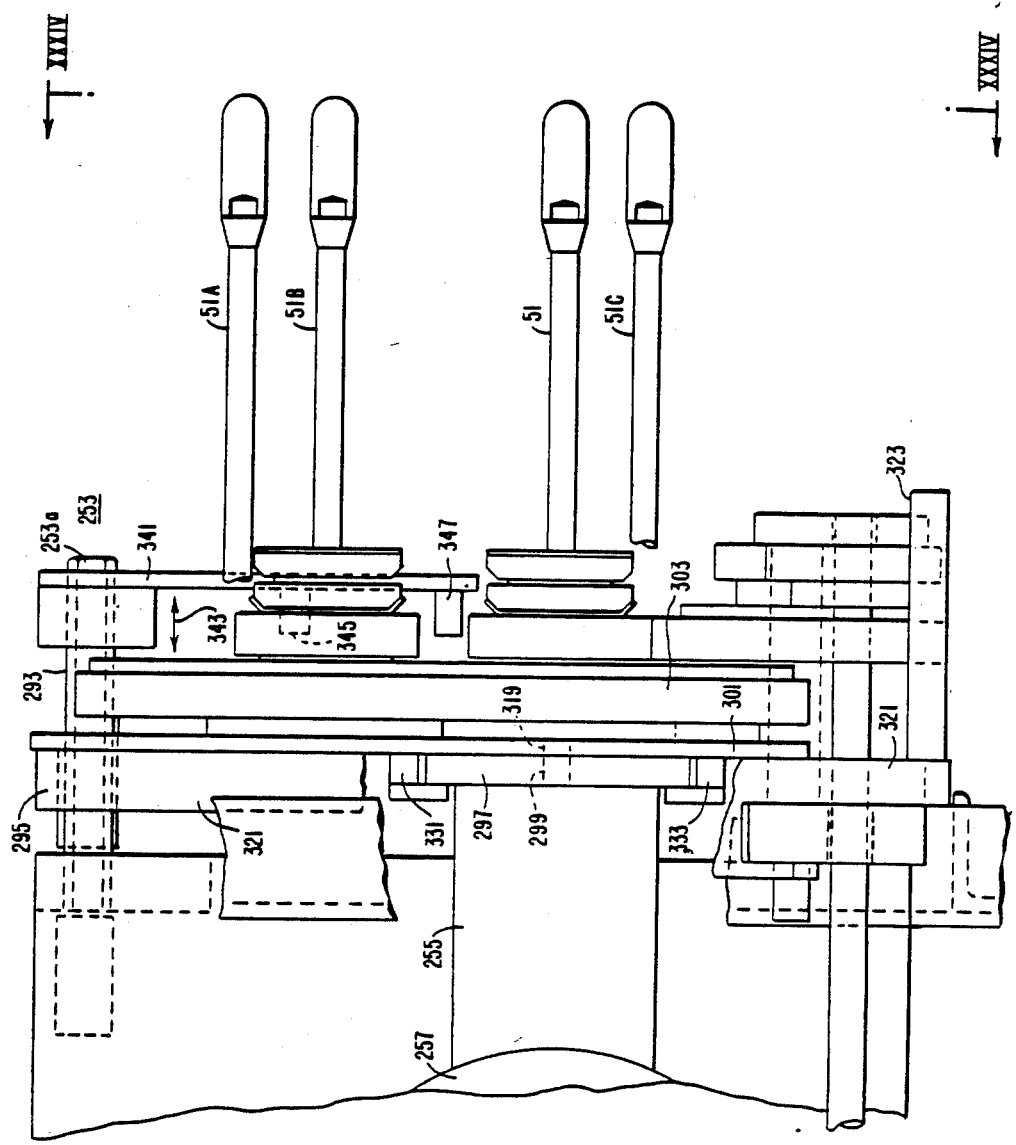
FIG. 32 is an elevational view of the turret assembly.
Figure 33:
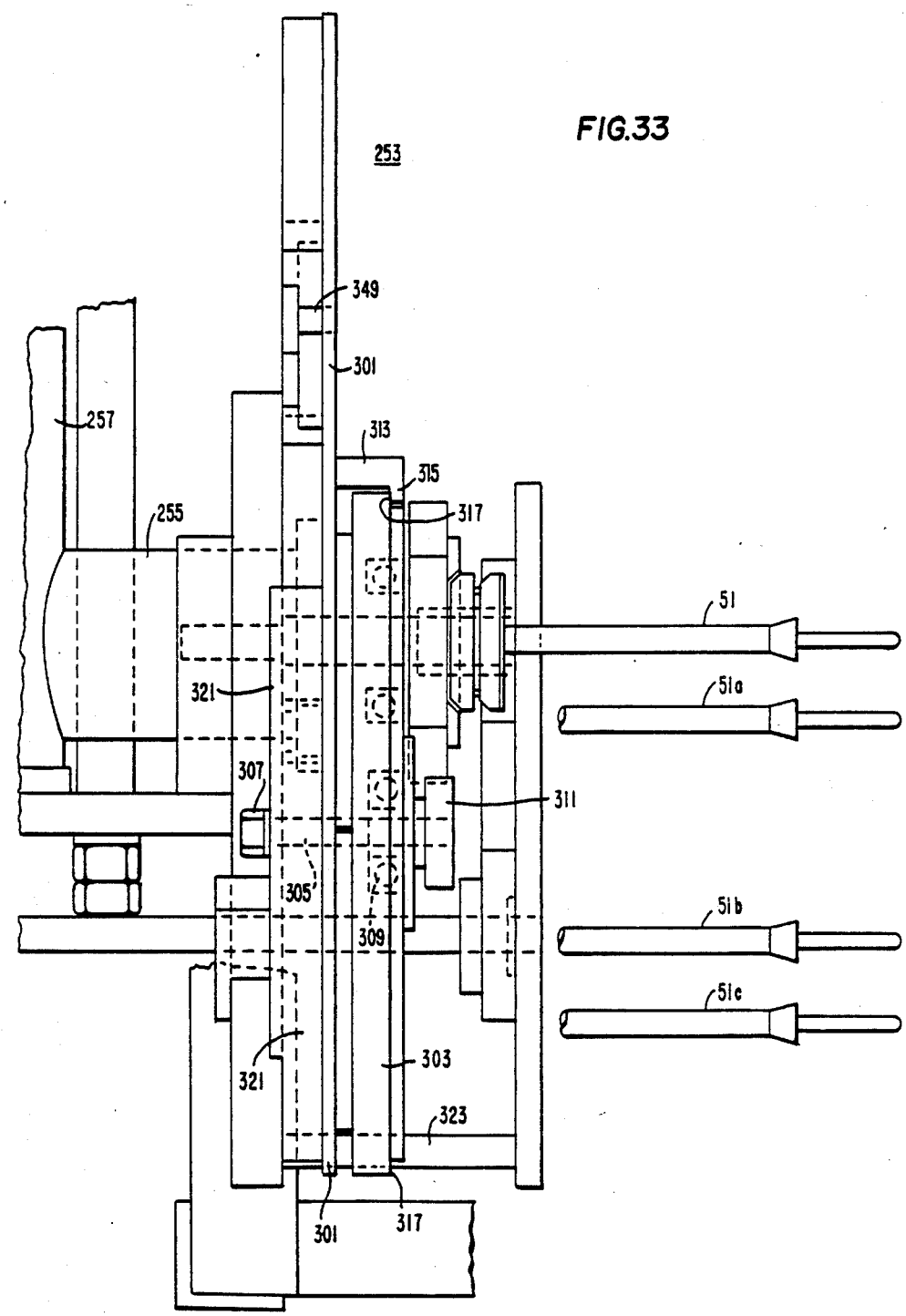
FIG. 33 is a plan view of the turret assembly.

Inasmuch as each shirred strand of casing 55 has a limited length, it must be replaced from time to time. The turret assembly 253 (FIGS. 32, 33, 34) is provided with a plurality of additional tubes 51a, 51b, 51c in which additional casings 55 may be mounted preliminarily during use of a particular horn 51. Thus the apparatus may be operated with only a slight delay, long enough to rotate the turret 90° to bring a casing mounted horn 51 into position. This is accomplished in a minimum of time thereby minimizing the time the apparatus is out of production. The turret 253 swings laterally on a pivot pin 293 out of place so that the turret may be rotated to bring another tube 51 into operating position without interferring with continued movement of the pincher members 59 and holders 79 (FIG. 4). The pin 293 is journaled (FIGS. 32, 34) in a mounting plate 295 of the frame and is positioned directly above the axes of the shaft 285 and the tube 51. As shown in FIG. 32, a flange plate 297 is mounted on the discharge end of the pipe 255 and includes an outlet port 299 for the filling.

The turret assembly 253 comprises a flat section plate 301, and a turret plate 303 which carries the several rotatable tubes 51. The sector plate 301 carries a pivot post 305 (FIG. 33) having a head nut 307 on which post the turret plate 303 is rotatably mounted on a ball bearing 309 where it is retained by a nut 311. An arcuate guide retainer 313 extends outwardly from the sector plate 301 and includes a radially in-turned lip 315 which bears against a shoulder 317 on the periphery of the turret plate for holding the turret plate tightly in place when pressure from the filling source in the pipe 255 tends to force the turret plate outwardly during extrusion and rotation of the tube 51.

The four horns 51, 51a, 51b, 51c are mounted on the plate at 90° intervals (FIG. 34) and the horn 51 is shown in operating position where it is aligned with the port 299 as well as a port 319 in the sector plate 301 (FIG. 32). In that position, the horn 51 is aligned with the aperture 185 (FIG. 14) and is also aligned with a plane parallel to that passing through the chains 133, 139. Each tube 51 includes one gear 289 which is driven by the gear 287 when the tube is in the operating position as shown in FIG. 34, whereby the tube is rotated.

When the shirred strand of casing 55 is consumed on a particular horn 51, the turret plate is used to move an assembly of another tube and casing into operating position. For that purpose, the turret assembly 253 is provided with an arm 321 which extends from the pivot pin 293 to a lower position where a handle 323 is provided for manually moving the turret assembly clockwise (FIG. 34) through an angle of approximately 30° as indicated by an arrow 325. A catch arrangement holds the sector plate in the retracted position while the turret is rotated 90°. A post 327 on the sector plate 301 limits movement of the turret assembly when the post contacts a block 329 on an adjacent stationary member (FIG. 34).

In the operating position, sector plate 301 is held in position by a catch 327a embedded in a latch 329a. Inasmuch as the pivot pin 293, the axis of the gear 289, and the shaft 285 (FIG. 34) are aligned, the gear 289 moves out of and into engagement with the continually rotating drive gear 287. Moreover, to maintain surface-to-surface contact of the sector plate 301 (FIG. 32) with the flange plate 297, a pair of arcuate guide rails 331, 333 having L-shaped cross-sections engage the back of the flange plate 297, so that when the turret assembly is moved out of operating position, the port 319 moves out of alignment with the outlet port 299 to close the latter and prevent movement of the filling from the feed tube 255.

When the sector plate 301 is retracted clockwise, the stop pin 335 is withdrawn from a notch 337 against a compression spring 339 and the turret plate 303 is rotated in either direction to bring the next tube 51, lined with a new casing, into operating position, whereupon the stop pin 335 engages a corresponding notch to hold the turret plate in place and the sector plate 301 is rotated counterclockwise to move the encased horn 51 into operating position. The corresponding gear 289 moves tangentially into mesh with the drive gear 287 and the port 319 (FIG. 32) moves into alignment with the port 299 and the tube 51.

A safeguard is provided on the turret assembly 253 to prevent accidental rotation of the turret plate 303 when the tube 51 is in operating position. As shown in FIGS. 32, 34, a guard plate 341 is slidably mounted in the direction of the arrow 343 (FIG. 32) on the pivot pin 293. The plate 341 includes two posts 345, 347 to prevent the gear 289 from moving upward, thereby preventing counterclockwise rotation of the turret plate 303 until the sector plate 301 is rotated fully 30° clockwise to bring gear 289 out of operating position. If an operator does not turn the turret plate 303 a full 90° to enable the stop pin 335 to enter the proper notch, pins 345, 347 prevent the gear 289 from entering any area except the proper area. The gear 287 prevents entry below center in a like manner. The plate 341 slides onto post 293 to enable its removal for cleaning. It is retained by a screw 253a. Post 347 prevents the gear 289 from entering anywhere but the prescribed place. Post 345 does the same for the gear 289 to prevent the tube 51a from entering until the turret is correctly located and the stop pin 335 is positioned.

A stop post 349 on the sector plate 301 contacts the flange plate 297 (FIG. 32) for holding the sector plate tightly against the flange plate. When the sector plate is rotated clockwise, the plate closes the filling outlet port 299 to prevent flow of the filling. Although the drive motor 265 may be turned off during turret operation, pressure on the emulsion in the cylinder is maintained.

The paddle or snubber 53 are shown in FIGS. 6–10 and in assembly in FIG. 5. In FIGS. 6 and 7, the tube 51 comprises a collar 351 tightly mounted on the horn and comprising an out-turned flange 353 which serves as a member for mounting the horn 51 to the tube 255. The tube, being a rigid member, is preferably composed of stainless steel and is sufficiently long to accept a shirred strand of casing 55 between the flange 353 and the paddle 53 which casing when fully extended has a length of about 50 feet. The bore of the tube 51 is sufficient to allow a maximum flow of filling from the feed tube 255 to the casing to form the links.

The paddle 53 is an elongated planar member having a mounting ring 355 which is mounted on the outlet end of the tube in a friction-tight fit. The paddle 53 is an elongated planar member having a width 357 substantially greater than the diameter of the tube 51 as well as of an opening 359 through which filling 57 issues from the tube 51 into the casing. The paddle 53 is a rigid member and may be composed of a metal but is preferably composed of a resilient plastic material. The paddle 53 is removed and the casing 55 is placed on the tube 51 up to the flange 353. A short length of casing is unshirred and drawn over the paddle 53 to slightly beyond the end of the paddle. Other paddle embodiments are shown in FIGS. 35, 36, 37. These do not interrupt the product flow but because of the diameters, the casing must unfurl as it emits from the tube 51; i.e., the casing cannot climb over the paddle ring in the shirred condition. All rotation and casing control is generated from inside the casing between the casing inside diameter and the diameter of the flow of filling 57 emitting from the tube. These embodiments are described below.

During stuffing of the casing with filling 57, the stuffed casing must be completely controlled from the time it slides over the ring 355 of the snubber until the pincher jaws 67, 69 (FIG. 4) close upon the stuffed casing. Close control prevents misalignment of the casing and the associated parts of the apparatus which handle it as it moves down the product path.

Figure 4A:
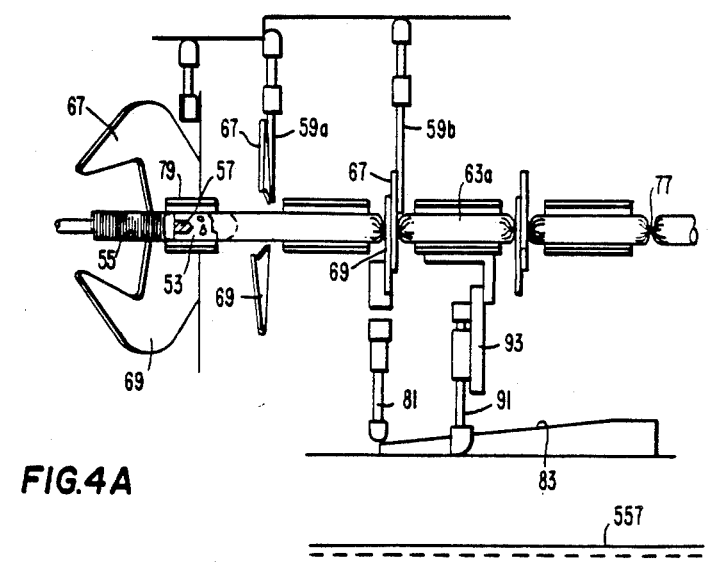
FIG. 4A is a fragmentary view showing the interaction between the pincher assembly and the associated cam.

Associated with the foregoing is the desirability of rotating the casing as it slips over the ring 355 as the filling moves into it. The width of the paddle 53 is greater than the diameter of the tube 51 so that as filling 57 passes into the casing, the paddle moves it radially outwardly against the casing and into a clearance space between opposite sides of the paddle so that the rotational movement of the paddle is transmitted through the filling to the casing. In this manner, the stuffed casing continues to rotate between the paddle and the jaws 67, 69 (FIG. 4a). Manifestly, when the pincher jaws 67, 69 close upon the stuffed casing, the rotational force imparted by the paddle through the filling will continue on the upstream side of the jaws 67, 69, but will be arrested on the downstream side thereof, thereby forming the twist 77 in the casing between product links. Therefore the links are formed by the closing of the jaws. It is noted that with filling in the clearance space between the paddle and the casing, the rotational force imparted from the tube and paddle assembly serves the dual purpose of supplying all the force that is necessary for product rotation and eliminating the need for any force exerted externally on the fragile casing. There is no friction on the casing walls internal or external because contact and driving force comes from the emulsion, thereby avoiding damage to the casing. As the casing is pulled away from the paddle by the closed jaws 67, 69 the filling completely occupies the casing including the void incurred by the paddle.

Another embodiment of the paddle means is shown in FIG. 11 in which a paddle 361 includes a plurality, such as four, prongs 363 extending from a mounting ring 365. The snubber 361 resembles the snubber 53 in that is preferably composed of a resilient plastic and is frictionally mounted on the outlet end of the tube 51. As shown in FIG. 12, the prongs 363 are disposed in a peripheral circle having a diameter less than that of the expanded casing 55 to provide spacing between the outer edges of the prongs and the casing in which filling is disposed to impart the rotational movement of the prongs to the casing.

In addition, the prongs 363 have greater radial dimension than thickness, whereby filling exiting from the outlet end of the tube 51 is free to move radially outwardly in response to backup pressure from the tube 51 in conjunction with the closing pincher jaws 67, 69, which are traveling at a slower rate along the product path than the emulsion speed emitting from the tube. That is, the pinchers 67, 69 advance at a predetermined speed. In the time it takes the pincher assemblies 59 to advance a distance equal to their spacing, the filling moves from the tube of one diameter to a casing of substantially larger diameter. Thus, the speed of material emitting from the tube is substantially greater than the pincher advance. Since the path is blocked by the closed pincher jaws, advancing at a slower rate the emulsion is forced radially through the splines of the paddle. Therefore, internal interference is avoided and the flow from the horn is not impeded. Thus, the several prongs 363, like the paddle 53 act upon the filling as it leaves the rotating tube 51 to continue the rotational movement of the filling once it enters the casing thereby imparting that rotational movement to the casing and maintaining that rotational control until the jaws 67, 69 pinch the stuffed casing into connected links.

Still another embodiment of the paddle is shown in FIG. 13 in which a plurality, such as two, prongs 367 are provided. The prongs 367 have a total width greater than the diameter of the casing in its perfectly circular condition so that as filling issues from the tube 51, the rotating prongs 367 impart rotation to the casing and to the filling as the casing moves beyond the prongs and forms a generally circular cross-section in a completely stuffed condition and before it is pinched by the jaws.

The foregoing embodiments of the paddle have a common characteristic of a spade-like configuration by which filling as it extrudes from the horn is forced into a dispersed attitude inside a casing. The spade-like configuration of the several embodiments drives the extruding column of stuffed casing rotationally to assure a product of links with the same twist at both ends. The pinching action of the jaws occurs precisely at the end of the several paddle embodiments. For this reason, a positive driving rotational force is applied on one side of the pincher assembly and a braking action on the other side, forming a twisted casing between the closed jaws.

As was set forth above with respect to FIG. 4, after the links are formed by the jaws 67, 69 with twisted ends, the knife blade 85 cuts the links into separate links 63, whereby they are carried by separate holders 79 along the path of movement to the dumping position where links are deposited in a container or box 101 (FIG. 4). For purposes of illustration, the links 63 are shown as being deposited in pairs (two links connected to each other) within the box 101. For that reason, two holder assemblies 61 are actuated to dump links 63 simultaneously. For that purpose, cam surfaces 95, 97 have identical profiles which are spaced by distances equal to the spacing between the cam rods 93. In this way, both rods are actuated simultaneously so that the paired links 63 are transferred together into the drop conveyor assembly 99.

In order for the adjacent transfer units 61 to function together on separate and adjacent cam surfaces 95, 97 the wear pads 249 (FIGS. 17, 18, 19) of alternate holders have an increased width substantially equal to the width of the pad 249 as indicated by the additional width 250 (FIG. 19). Thus, the narrower wear pads 249 ride only on the cam surface 95 and the alternate wider wear pads engage the adjacent cam surface 97, whereby both pads 249, 250 ride up corresponding cam surfaces to their upper ends simultaneously, causing the transfer units to transfer two links 63. By pairing adjacent cam holders, the transfer units function in concert with each other to transfer or throw two links lined end-for-end together. The transfer units rotate through 90° and transfer the links so that the drop conveyor receives them simultaneously. They are deposited at the lower end of the drop conveyor simultaneously into precise positions onto the moving boxes 101, whereby room is made for the next pair of links 63. It is noted that the cam surfaces 95, 97 are non-linear, because the throw or movement of the transfer arm must have acceleration in its arc to control the product links through the 90° path of motion. If it is too fast, it will throw the links outwardly. If it is too slow, the links will fall out prematurely. Since the speed of the linking chain is constant and the transfer unit 63 is cam-actuated an ever stepper ride (non-linear) is necessary to control the links 63 through this action. Linear cam surfaces could not accomplish this purpose.

The drop conveyor 99 (FIGS. 3, 4) is shown more particularly in FIGS. 24 and 25. The conveyor comprises an outside conveyor 369 and an inside conveyor 371. The outside conveyor includes a pair of spaced link chains 373, 375 between which extends spaced rods 377. Similarly, the inside conveyor 371 comprises a pair of spaced link chains, one of which chains 379 is shown (FIG. 25) with similar rods 381 extending therebetween. The chains 373, 375 are disposed over similar sprockets 383 on a drive shaft 385 at the top of the conveyor and at the lower end of the conveyor the chains are disposed over similar sprockets 387 on an idler shaft 389. In a similar manner, the chains 379 are disposed over similar sprockets, one of which sprockets 391 is shown and which sprockets are mounted on a shaft 393 at the upper end. The lower end of the chains 379 are disposed over idler sprockets 395 on a shaft 397. Thus, the transfer units or conveyor assembly function together to transfer two aligned links (connected or unconnected).

The outside conveyor includes a pair of spaced support members 399, 401. Similarly, the inside conveyor comprises a pair of support members 403, 405. A pair of spacer bars 407, 409 (FIGS. 24, 25) hold the support members 399, 401 spaced from each other. Likewise, spacer bars 411, 413 hold the support members 403, 405 in laterally spaced positions. The drive shaft 385 and the idler shaft 389 are journaled in place at upper and lower ends of the support members 399, 401, and in a similar manner the shafts 393, 397 are journaled in place at upper and lower ends of the support members 403, 405.

Power is delivered from a motor 415 (FIG. 3) through a gear box 417 and a chain 419 to the shaft 385. The shaft 385 extends to the left (as viewed in FIG. 24) to a gear train (FIGS. 26, 27) including gears 421, 423, 425, 427. Gears 423, 425 are mounted on shafts 429, 431 which are journaled in spaced support plates 433, 435. The gear 427 is mounted on a shaft between spaced plates 439, 441 which plates are pivotally mounted on the shaft 431. The gear 427 drives the shaft 437 (FIGS. 24, 25) through a sprocket 443 and a chain 445 which in turn drives the shaft 393 through a sprocket 447. Thus, the link chains 373, 375 on the outside conveyor 369 are driven clockwise (FIG. 25) and the corresponding link chains 379 on the inside conveyor 371 are driven counterclockwise for supporting links 63 (FIG. 3) as they move from the transfer unit 79 to the container or box 101.

The inside and outside conveyors 369, 371 are adjustable toward and away from each other infinitely so that a very sensitive grip on the product links 63 is accomplished. For that purpose, a pair of similar guide bars 449 extend between the conveyors which guide bars are fixedly mounted in corresponding support members 403, 405 of the inside conveyor 371. Spaced support members 399, 401 are slidably mounted on the guide bars 449. A pair of threaded rods 451 having adjusting knobs 453 provide means for moving the two conveyors 369, 371 toward or away from each other. It is for this reason that the plates 439, 441 (FIGS. 26, 27) are pivotally mounted on the shaft 431, thereby maintaining the drive through the shaft 437 notwithstanding the spacing between the inside and outside conveyors.

A box conveyor generally indicated at 455 (FIG. 3) is inclined at an angle with the lower end disposed below the drop conveyor 99 for continuously delivering boxes for the links 63 as they drop from the lower end of the drop conveyor. The box conveyor 455 comprises a pair of spaced side rails 457, 459 (FIG. 28A) which are supported at opposite ends on similar cross-support members 115 (FIG. 3). Cross members 461 (FIGS. 28A, 28B) support a pair of box rails 463 which extend through the length of the conveyor. The boxes 101 are placed at the upper end of the rails 463 and slide downwardly to the load zone position under the lower end of the drop conveyor 99.

Power for the box conveyor is provided by the motor 415 through the gear box 417, chains 465, 467, 469. As shown in FIGS. 28A, 29, 30, 31, box conveyor chains 469 carry spaced brackets 471 which support cross rods 473. The cross rods carry spaced pairs of paddles 475 having upturned ends 477. The spacing successive pairs of ends 477 is such that the boxes 101 are driven in the direction of the chain travel, each box being driven sequentially by one pair of paddles 475 so that a steady stream of boxes 101 pass the product loading zone under the drop conveyor 99. The paddles 475 are so positioned that they contact the side of the box riding the rails 463 as shown in FIGS. 28A, 29-31.

Figure 28A:
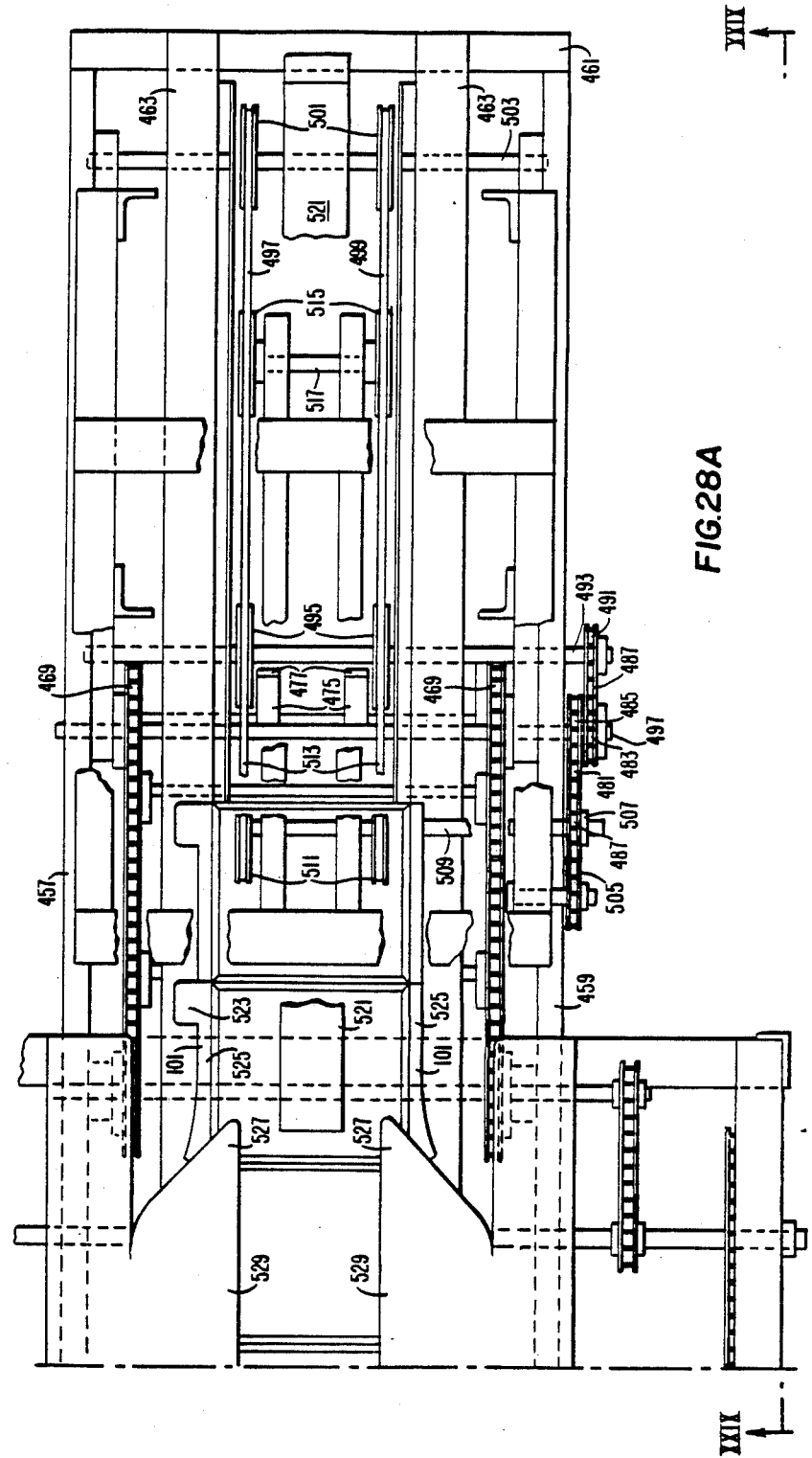
FIGS. 28A-28B collectively illustrate the plan view of the box conveyor for delivering boxes to the lower end of the drop conveyor.
Figure 28B:
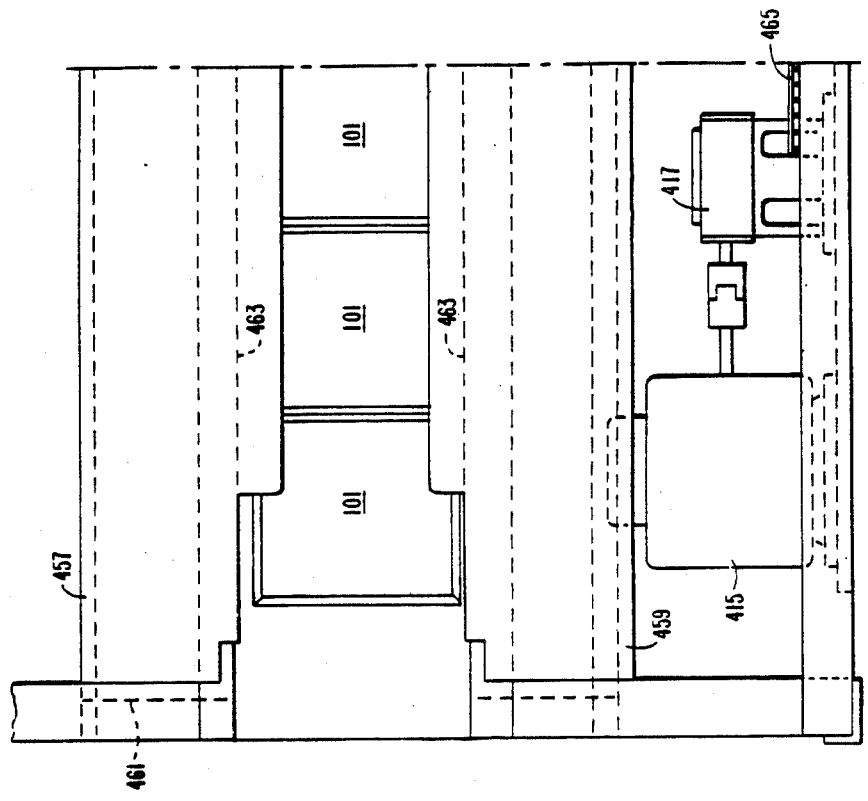

A shaft 479 is driven by a sprocket 481 and drives two sprockets 483, 485 on the shaft 479. The sprocket 483 drives a chain 487 for driving a sprocket 491 keyed on a shaft 493 for rotating pulleys 495 (FIGS. 28A, 29)

which in turn drives a pair of accumulator belts 497, 499 extending around idler pulleys 501 on shaft 503.

Similarly, sprocket 485 drives a chain 505 causing a sprocket 507 to rotate a shaft 509 which carries a pair of pulleys 511. Belts 513 riding on the pulleys 511 idle on pulleys 515 on a shaft 517. As shown in FIG. 29, the upper belts 513 and pulleys 511, 515 are carried in a frame 519 which is adjustable vertically so that the upper belts 513 and lower belts 497, 499 are adjustably adapted to lightly urge each box downwardly on the box rails 463. The belts are timed so that they travel slightly faster than the box drive chain 469 so that a steady uninterrupted supply of boxes move against the paddles 475. A guide 521 is provided above the path of the boxes 101 (FIG. 29) to ensure that the row of boxes do not buckle up as the belts move the boxes toward the paddles.

As the boxes 101 move toward the loading zone, box lids 523 and side flaps 525 are plowed down by upturned ends 527 of retainers 529. That is, the lids 523 and flaps 525 of the boxes 101 are pressed downwardly so that the lower end of the drop conveyor 99 (FIG. 3) extends as closely as possible to the box position, thereby reducing the free fall of the stuffed links between the drop conveyor and the box. A buffer pad 529 supports the boxes directly under the drop conveyor 99 in order to check or dampen any vibrations which may occur between the bottom of the box and the links 63 as they fall into position adjacent previously-placed links.

As shown in FIG. 3 the motor 415 simultaneously drives the chain 419 and the chain 465 in order to synchronize operation of the drop conveyor chains and the box conveyor. Inasmuch as the motor drives the chains 419, 465 through the gear box 417, and in conjunction with proper gearing and sprocket combinations, the speed of the box conveyor 455 and the drop conveyor may be varied for different combinations of box patterns and sizes as well as different link diameters.

As shown in FIG. 4A, the length of the filled casing 55 is shown just prior to closing of jaws 67, 69 of the particular pincher member 59A. That is, before closing of the jaws the filled casing extends from the closed jaws of pincher member 59B to the end of the paddle 53.

As shown in FIGS. 17, 18, and 19 where the links 63 are substantially smaller than the spaced parts of the holder 79, a brake spring 531 may be mounted on the holder 79 for retaining the link in place. The brake spring 531 is composed of a flexible metal including a clip portion 531a and a flange 531b (FIG. 18). The brake spring 531 may be detachably mounted for use when links 63 are of a smaller size than the holder, whereby the clip portion 531a is clipped onto the upper parts 79a of the holder. After the link 63 is in place in the holder, the spring is depressed downwardly against the link by a presser link 535 (FIGS. 15, 16) which is mounted on a shaft 537 extending outwardly from the jaws 67. Accordingly, when the jaws 67, 69 close upon the filled casing 55 the presser link 535, being a flexible member and disposed over the brake spring 531 of the adjacent holder, presses upon the flange 531b to hold the link 63 in place within the holder.

Inasmuch as the filling 57, such as sausage, is a heterogeneous material sometimes containing chunks of grissle and the like, the cam 83 (FIG. 1) may be mounted on a lever 539 pivoted about a pin 541 extending from the frame. Under normal conditions, the cam surface 83 is retained in operating position by a tension spring 543 (FIG. 1) attached to the end of the lever opposite that of the cam, whereby the cam actuates the knife blade 85 for cutting the links into separate units. Where the filling contains a material that resists cutting, the cam lever 539 may be lifted against the pressure of the spring 543, to remove the cam surface 83 from the path of the pincher member containing the knife blade 85, thereby preventing damage to the pincher assemblies 59 and/or blades 85.

As shown in FIGS. 14, 15, 16, a disk 545 may be mounted on a pin 547 extending from a support 549 on the upper jaw 67. When the jaws of the pincher assembly 59 close, pressure may be necessary to keep these jaws closed during the camming functions of the pinchers downstream, such as cutting or keeping the pincher closed against the product pressure tending to force the pinchers open. The wheel 545 is provided to ride under cam 546. This holds the pinchers closed as the wheel rides the rail provided.

When the transfer unit 61 is retracting through the springs 221, a cam surface 551 (FIG. 1) retracts the transfer unit by bearing on the surface 551. This precaution is provided in the event that the holder does not retract quickly enough to prevent it from striking the drop conveyor frame and support members.

Other embodiments of the horizontal tube or horn 51 and the paddle 53 are shown in FIGS. 35, 36, 37. In FIG. 35, a nozzle or snubber 553 includes finger-like paddles or prongs 555 which are circumferentially placed and integral with a tube 557. In the alternative, the snubber 553 may be detachably mounted on the outlet end of the tube 557. The advantage of this embodiment is that there is no interruption in the flow of filling from the tube into the casing 55. Moreover, the tube 557 may be secured in place within the feed tube 255 by means of a bayonet joint 559 instead of a threaded connection 291 (FIG. 11). Where a bayonet joint 559 is provided to expedite connection and disconnection of the tube, an O-ring 561 is preferred to seal the tube in place.

In FIG. 37 a plurality of prongs 563 are provided on nozzle. Each prong extending radially outwardly and having peripheral flange portions at the outer circumference of the prongs. This configuration defines the approximate diameter of the casing and like the prior embodiments of the nozzle, facilitates rotation of the casing when it is stuffed with filling 57.

Although one stuffing position and one box conveyor is provided, at least one other combination of stuffer and box conveyor may be provided on the opposite side of the apparatus. That is, as the pincher members 59 and transfer units 61 move around the right end of the apparatus, another filler tube, such as tube 51, may be provided for filling another casing. Moreover, a second drop conveyor and box conveyor may be provided on the opposite side of the apparatus as viewed in FIG. 1.

Another embodiment is shown in FIG. 38 in which at least two apparatus 50 are shown in adjacent positions. Each apparatus 50 has the arm 91 disposed in the dumping position, whereby links 63 are dropped into an associated drop conveyor 99 as set forth above. As the links are delivered from the lower ends of the drop conveyors, they are deposited onto a conveyor belt 565. The belt 565 extends between and over pulleys 567, 569, 571, 573.

The links 63 are carried by the belt 565 to a drop conveyor 575 by which the links are dropped into the receptacles or boxes 101 into uniformly compact positions. The drop conveyor 575 functions similarly to the drop conveyors 99 and include a continuous conveyor 577 that cooperates with the moving portion of the belt 565 between the pulleys 569 and 571 to support the links 63 as they are lowered into the boxes 101 at precisely-timed intervals. Each box 101 is carried in a tray 579 of which there are a plurality mounted on a continuous conveyor 581. The boxes 101 move in the direction of an arrow 583 (FIG. 38) with loaded boxes being replaced with empty boxes as shown.

In conclusion, the device of the present invention provides for automatic stuffing of a shirred strand of casing and handles the filled links automatically and without contact with attending personnel. The automatic operation is complete and provides for automatic packaging without handling of the product by personnel. A salient feature of that procedure is that the bacteria count on the product is considerably lower because of reduced handling and the product is therefore subject to longer shelf life in stores compared to the present system of manually placing each product in trays. Finally, automatic packaging reduces labor costs and improves the appearance of the product links in the shipping packages.

What is claimed is:

1. Apparatus for processing stuffed sausage casing or similar product by pinching the stuffed casing into individual links, then cutting the pinched links into predetermined link lengths, and then loading the formed links into containers, said apparatus comprising:

a motor driven endless drive device operable to move at a predetermined rate of speed;

a plurality of casing work-performing mechanisms carried on said endless drive device, each said work-performing mechanism including a stuffed casing pinching mechanism, a pinched casing cutting mechanism, and a hollow elongated casing-and-formed-link holding device, each said casing-and-formed-link holding device being sized to hold casing during the casing pinching and cutting operations, and each said casing-and-formed-link holding device provided with an open side portion which parallels said endless drive device;

a feeding mechanism for feeding stuffed casing into said casing-and-formed-link holding devices as they are moved on said endless drive device;

said pinching devices which form a part of said work-performing mechanisms being actuated by the motion of said endless drive device past a pinching cam to pinch a short section of the stuffed casing to form pinched links of predetermined length;

said cutting devices which form a part of said work-performing mechanisms being actuated by the motion of said endless drive device past a cutting cam to cut the pinched link sections to form separate links of predetermined length with said formed links being retained by said link holding devices;

a link unloading station positioned next to the path of said endless drive device, said link holding devices being actuated by the motion of said endless drive device past a stationary unloading cam to be rotated transverse to the path of said endless drive device so that the open side portions of said link holding devices are positioned to eject the formed links from said link holding devices;

a finished link conveying device comprising two spaced continuously moving conveyors moving at a predetermined rate of speed and positioned parallel to the path of said endless drive device, said finished link conveying device positioned to receive the links ejected from said link holding devices and to convey said links at a predetermined rate of speed to a link ejection position; and a container feeding mechanism for moving containers in a direction perpendicular to the path of said continuously moving link conveyors at a predetermined rate of speed and beneath said finished link conveying device so that the ejected finished links drop into said containers in adjoining and parallel position.

2. The apparatus as specified in claim 1, wherein said motor driven endless drive device comprises a pair of endless chain drive devices positioned parallel one another and operable to move at a predetermined rate of speed, and said plurality of work-performing mechanisms are carried between said pair of chain drive devices.

3. The apparatus as specified in claim 1, wherein said link holding devices are each affixed to a lever, and when said link holding devices enter into said unloading station said levers are actuated by said unloading cam and are sequentially rotated in a direction transverse to the motion of said endless drive device to eject the formed links from said link holding devices.

4. The apparatus as specified in claim 3, wherein said unloading cam which operates to unload said finished links is non-linear so that motion of said link holding devices during unloading is initially relatively slow and is then speeded up to eject the finished casings.

5. The apparatus as specified in claim 3, wherein more than one of said levers which are adjacently positioned are simultaneously actuated so that more than one formed link is ejected at the same time from said link holding devices.

6. The apparatus as specified in claim 5, wherein a pair of said levers is simulataneously actuated.

7. Apparatus for stuffing sausage or similar product into a shirred casing, then forming the stuffed casing into individual twisted links, then cutting the formed links into predetermined links lengths, and then loading the cut lengths of links into containers, said apparatus comprising:

a motor driven endless drive device operable to move at a predetermined rate of speed;

a plurality of work-performing mechanisms carried by said chain drive device, each said work-performing mechanism including a stuffed casing pinching mechanism, a casing cutting mechanism, and a hollow elongated link holding device, each said link holding device being sized to loosely hold a link during the pinching and cutting operations, and each said link holding device having an open side portion which is aligned with said chain drive device;

a hollow rotary horn device having an open end and including a paddle device affixed proximate the open end thereof and rotatable therewith, said horn operable to have the material to be stuffed forced from the open end thereof and past said paddle device, said rotary horn device positioned proximate the path of said work-performing mechanisms so that said open end and said paddle device project into the open side portions of said link holding devices as they are moved past said rotary horn device, shirred casing adapted to be carried on said rotary horn device so that as stuffing material is formed from the open end of said rotary horn device and past said rotating paddle device, the stuffing material fills and straightens the casing and also twists the casing because of the rotation of said paddle device;

said stuffed casing pinching mechanism which forms a part of each said work performing mechanism being actuated by the motion of said chain drive device past a pinching cam to pinch a section of the filled casing after a predetermined portion of the filled casing has passed said paddle device, said casing upon being pinched while a following portion of said casing is still being filled with rotating stuffed material causing said casing to twist at the pinched portion thereof;

said cutting mechanism which forms a part of each said work performing mechanism being actuated by the motion of said chain drive past a cutting cam to cut the twisted link sections at twisted portions thereof into predetermined lengths of links;

a link unloading station positioned next to the continuous path of said chain drive device, each said link holding device being actuated by the motion of said chain drive device past a stationary unloading cam to be rotated through approximately ninety degrees so that the open sides of said link holding devices are rotated to face downwardly to eject the links therefrom, and said stationary unloading cam having a non-linear cam surface so that the rotation of said link holding devices during unloading is initially relatively slow and the rotation is then speeded up to eject the links;

a finished link conveying device comprising two spaced continuously moving conveyors moving at a predetermined rate of speed and positioned to parallel the path of said continuous chain drives, said conveying device positioned to receive the links ejected from said link holding devices and to convey same at a predetermined rate of speed to a link ejection position; and a container feeding mechanism for moving containers in a direction perpendicular to the path of said continuously moving finished link conveying device at a predetermined rate of speed and beneath said finished link conveying device so that the ejected finished links sequentially drop into said containers in adjoining and parallel position.

8. The apparatus as specified in claim 7, wherein said motor driven endless drive device comprises a pair of endless chain drive devices positioned parallel one another and operable to move at a predetermined rate of speed, and said plurality of work-performing mechanisms are carried between said pair of chain drive devices.

9. The apparatus as specified in claim 7, wherein said paddle device comprises a blade rotatable with and radially wider than said rotary horn device so as to unfurl and rotate the casing off the end of said tube by pushing the stuffing product against the casing as the stuffing product issues from said rotary horn device.

10. The apparatus as specified in claim 7, wherein said pinching device operates to hold the pinched portion of said casing from rotation while the following portion of said casing is still being rotated by the filled stuffing product to cause the casing to twist at a section just following the pinched portion.

11. The apparatus as specified in claim 7, wherein said link holding devices are each affixed to a separate lever, and when said link holding devices enter into said unloading station said levers are actuated by said unloading cam and sequentially rotated in a direction transverse to the motion of said endless drive device to eject the formed links from said link holding devices.

12. The apparatus as specified in claim 11, wherein said unloading cam which operates to unload said finished links is non-linear so that motion of said link holding devices during unloading is initially relatively slow and is then speeded up to eject the finished casings.

13. The apparatus as specified in claim 12, wherein more than one of said levers which are adjacently positioned are simultaneously actuated so that more than one formed link is ejected at the same time from said link holding devices.

14. The apparatus as specified in claim 13, wherein a pair of said levers is simultaneously actuated.

* * * * *